US006553655B2

(12) United States Patent
Suzuki

(10) Patent No.: US 6,553,655 B2
(45) Date of Patent: Apr. 29, 2003

(54) TERMINAL EXTRACTING TOOL

(75) Inventor: Kenji Suzuki, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/971,021

(22) Filed: Oct. 5, 2001

(65) Prior Publication Data

US 2002/0040520 A1 Apr. 11, 2002

(30) Foreign Application Priority Data

Oct. 6, 2000 (JP) ...................................... 2000-307692

(51) Int. Cl.$^{7}$ ................................................ B23P 19/00

(52) U.S. Cl. ............................ 29/762; 29/762; 29/764; 29/758; 29/750; 29/876; 29/881

(58) Field of Search .......................... 29/762, 764, 758, 29/750, 876, 881

(56) References Cited

U.S. PATENT DOCUMENTS 4,799,819 A * 1/1989 Swoboda .................... 403/187
4,999,914 A * 3/1991 Cheng ......................... 29/271
5,598,624 A * 2/1997 Ito et al. ........................ 29/593
5,716,235 A * 2/1998 Endo et al. ................. 439/596
6,067,705 A * 5/2000 Boyde et al. ................. 29/762
6,098,276 A * 8/2000 Espiritu ........................ 29/747
6,173,488 B1 * 1/2001 Endo et al. ................... 29/278

* cited by examiner

*Primary Examiner*—Carl J. Arbes
*Assistant Examiner*—Tai Nguyen
(74) *Attorney, Agent, or Firm*—Armstrong, Westerman & Hattori, LLP

(57) ABSTRACT

A terminal extracting tool, which can extract a male type terminal in a female type connector, having a beam member provided at a front end thereof with a lock release pin to abut on a flexible locking piece of a connector housing, a holder slideably receiving the beam member, and an elastic member provided in the holder in a compressed condition to push the beam member rearwardly. The front end of the lock release pin is placed behind a front end surface of the holder. The beam member has juxtapositionally at least two members to slide independently of each other, each pushed rearwardly by respective elastic member. The beam member is provided at a rear area with a grip divided for each member.

8 Claims, 5 Drawing Sheets

TERMINAL EXTRACTING TOOL

BACKGROUND OF THE INVENTION

1. Field of the Invention

This invention relates to a terminal extracting to relieve locked terminal by bending a flexible locking piece in a connector housing.

2. Description of the Related Art

FIGS. 13 and 14 show terminal extracting tools by prior art.

FIG. 13 shows a terminal extracting tool 60 for a male type terminal 63 which is received in a female type connector housing 68 and locked by a flexible locking piece 67 with fixed one-end. The male type terminal 63 is provided at one end thereof with a tab-shape electrical contact portion 64 and at the other end thereof with an electric wire joint portion 65 and between the electrical contact portion 64 and the electric wire joint portion 65 with a locking portion 66. The flexible locking piece 67 is extended forwardly to project cantilever-likely into an inner wall of a terminal receiving section 69 of the connector housing 68. The flexible locking piece 67 is locking the terminal by contacting with the locking portion 66. The terminal extracting tool 60 is provided at the end thereof with an upper slant sharp edge portion 61 to release locking by the flexible locking piece 67.

Extracting the male type terminal 63 with such an extracting tool is done by holding the connector housing 68 by one hand, holding a grip portion 62 of the extracting tool 60 by the other hand, inserting the end of the extracting tool 60 from the front of the connector housing 68 into the terminal receiving section 69, pushing the sharp edge portion 61 into a gap between the flexible locking piece 67 and the locking portion 66 and bending the flexible locking piece 67 upwardly to release locking. And then, the male type terminal 63 is extracted from the terminal receiving section 69 by pulling an electric wire 50.

FIG. 14 shows a terminal extracting tool 70 for a female type terminal 76 which is received in a male type connector housing 80 and locked by a flexible locking piece 81. Detailed description overlapped above will be omitted here. The female type terminal 76 is provided at one end thereof with an electric wire joint portion 77 and at the other end thereof with a female type electrical contact portion 78 and on a outer surface of the electrical contact portion 78 with a concave portion to contact with a flexible locking piece 81. The female type electrical contact portion 78 is formed into a hollow structure and provided inside with an elastic contact piece 79 to increase contact surface pressure with a mating male type electrical contact portion. The extracting tool 70 is comprised of an outer case 73 having a guide groove, a positioning member 74 engaging with the guide groove and having a convex portion 75 which engages a terminal insertion opening 82 at a front end of the connector housing 80 and a release plate 71 fixed on the outer case 73 and provided with an elastic member for energizing the positioning member 74 and with a lock release pin 72 for the flexible locking piece 81 in the connector housing 80. The lock release pin 72 is placed behind the convex portion 75. When engaging the convex portion 75 with the terminal insertion opening 82 and pushing it forwardly, the convex portion 75 moves back and the lock release pin 72 comes out forwardly. The lock release pin 72 is provided on the front end with a slant surface which has the same angle and direction as those of a slant surface on the front end of the flexible locking piece 81. Pushing the terminal extracting tool 70 forwardly, the slant surface on the front end of the lock release pin 72 contacts the slant surface of the flexible locking piece 81 and bends the flexible locking piece 81 upwardly. Thus, locking by the flexible locking piece 81 is released and the female type terminal 76 can be extracted easily by pulling the electric wire 50 rearwardly.

Objects to be Solved

Regarding the first prior art as mentioned above, it is hard to position a lock release pin smoothly to a flexible locking piece for locking a terminal and then operation of releasing terminal lock is skilled job. Extracting action is required to concentrate a very small gap between a flexible locking piece and a locking portion with holding a connector housing. Further, inexperienced handling of terminal extracting tool may cause damaging a connector housing by inserting a lock release pin into wrong portion in a connector housing or deforming a terminal by pushing the terminal because of an obstacle by a tab-shape electrical contact portion. Furthermore, an operator may be hurt by a front end of the lock release pin that is thin and has a relative sharp top edge.

Regarding the second prior art as mentioned above, positioning a lock release pin can be controlled preciously and releasing terminal lock can be done securely without much experience. However, the extracting tool is only for a male type connector receiving a female type terminal therein and can not be applied to a female type connector because of the extracting tool structure. Therefore, a terminal extracting tool, which can be applied to a female type connector and can release lock of a male type terminal easily, is desired.

This invention has been accomplished to overcome the above drawbacks and an object of this invention is to provide a terminal extracting tool which can be applied to a female type connector and be operated easily without fail to release a male type terminal.

How to Attain the Object

In order to attain the objects, there is provided a terminal extracting tool, for extracting a terminal locked by a flexible locking piece in a terminal receiving section of a connector housing, comprising a beam member including a lock release pin at front end thereof to be contacted with the flexible locking piece, a beam member guide hole for receiving the beam member slidably and freely therein, a pin guide hole communicating with the beam member guide hole, a holder provided with an escape for an electrical contact portion of the terminal and an elastic member mounted in said beam member guide hole for energizing the beam member rearwardly (claim 1).

Preferably, placing a front end of the lock release pin in said beam member energized by the elastic member behind a front end surface of said holder is effective (claim 2).

Preferably, comprising said beam member juxtapositionaly at least two members that can slide in an axial direction independently of each other is effective (claim 3).

Preferably, energizing each of said members rearwardly by respective elastic member is effective (claim 4).

Preferably, providing the beam member at a rear position thereof with a grip which is separated for each of said members is effective (claim 5).

Preferably, providing the beam member on one side wall thereof with a positioning projection as a stopper and providing the holder on a side wall thereof with an oval opening to engage with the positioning projection to slide freely are effective (claim 6).

Preferably, providing the holder with a stepped end surface for positioning itself to insert it into the connector is effective (claim 7).

Preferably, providing the holder on a bottom surface thereof with a convex spline for engaging with a groove of a connector fitting section to slide freely is effective (claim 8).

Acting and effects according to above structure will be described as following.

In case of claim 1 of this invention, when inserting a holder into a connector fitting section and pushing it inwardly, the front end surface of the holder abuts on a rear wall of the connector fitting section and then moving the holder forwardly is limited. At that time, the electrical contact portion, projecting like a cantilever, of the male type terminal is received in an escape of the holder. Furthermore, sliding the beam member forwardly, the front end of the lock release pin comes out from the front end surface of the holder and abuts to the front end portion of the flexible locking piece. The front end of the lock release pin slides under the front end portion of the flexible locking piece and bends the flexible locking piece upwardly and then releases locking. The male type terminal is extracted by pulling the electric wire. After that, when abating force to energize the beam member, the lock release pin projecting from the front end surface of the holder is pulled into the holder by elastic force of the elastic member and received in the holder.

In case of claim 2 of this invention, the front end of the lock release pin does not come out outside in a condition of not pushing the beam member forwardly.

In case of claim 3 of this invention, since the beam member, provided at the front end with the lock release pin, is divided in an upper part and a lower part at a partition line, each member of the beam members can slide independently of each other in a condition of connecting the holder with the connector fitting section.

In case of claim 4 of this invention, each part of the divided beam members in upper and lower tiers is energized by respective coil spring and then one member action is not affected by the other member action.

In case of claim 5 of this invention, operation for each beam member can be done by each grip.

In case of claim 6 of this invention, forward/rearward moving limits of the beam member is determined and also projecting length of the lock release pin is determined.

In case of claim 7 of this invention, forward moving of the holder is limited by abutting the stepped end surface of the holder on an open end surface of the connector housing in a condition of not pressing the holder to touch the front surface to the rear wall of the connector fitting section.

In case of claim 8 of this invention, engaging a dovetail shape convex spline provided on the bottom surface of the holder with a groove of a connector fitting section, positions the holder in a width direction.

Effects of the Invention

According to claim 1 of this invention, as mentioned above, inserting a holder into a connector fitting section and pushing it more forwardly, a front end surface of the holder abuts on a rear wall surface of the connector fitting section and then moving the holder more forwardly is limited. At that time, an electrical contact portion, projecting like a cantilever, of a male type terminal is received with an escape hole of the holder. Furthermore, sliding a beam member forwardly, a front end of a lock release pin comes out from the front end of the holder and abuts on a front end of a flexible locking piece. The front end of the lock release pin slides under the front end of the flexible locking piece and bends the flexible locking piece upwardly to release terminal lock. Thereby, the male type terminal is extracted by pulling an electric wire. After that, when abating force to push the beam member, the lock release pin, projecting from the front end surface of the holder, is pulled into the holder by elastic force of the elastic member and received in the holder. Thereby, the terminal lock can be released easily and safely, not damaging a tab-shape electrical contact portion of the male type terminal.

According to claim 2 of this invention, the front end of the lock release pin does not come out outside in a condition of not pushing the beam member forwardly. Therefore, hurting an operator or damaging a connector housing by the front end of the lock release pin is prevented.

According to claim 3 of this invention, since the beam member, provided at the front end with the lock release pin, is divided in an upper member and a lower member at a partition line, each of the beam members can slide independently of each other in a condition of connecting the holder with the connector fitting section. Therefore, upper and lower terminals can be released by only one time positioning the terminal extracting tool.

According to claim 4 of this invention, each of the divided beam members in upper and lower tiers is energized by respective coil spring and then facility of a terminal extracting operation can be enhanced.

According to claim 5 of this invention, operation for each beam member can be done by each grip and then facility of a terminal extracting operation can be enhanced.

According to claim 6 of this invention, back-and-forth moving limits of the beam member is determined and also projecting length of the lock release pin is determined. Therefore, damage of the male type terminal 40 by over moving forwardly is prevented and the lock release pin can be received in the holder.

According to claim 7 of this invention, forward moving of the holder is limited by abutting the stepped end surface of the holder on an open end surface of the connector housing in a condition of not pressing the holder to abut the front surface on the rear wall of the connector fitting section. Therefore, positioning the lock release pin forwardly can be done securely.

According to claim 8 of this invention, positioning a holder in a width direction is done by engaging a dovetail shape convex spline, provided on the bottom surface of the holder, with a groove of a connector fitting section. Therefore, miss-insertion is prevented and operation of extracting a terminal can be enhanced.

DESCRIPTION OF THE PREFERRED EMBODIMENT

One embodiment of this invention will now be described with reference to the attached drawings.

FIGS. 1–5 show one embodiment of a terminal extracting tool according to this invention.

Figure 1:
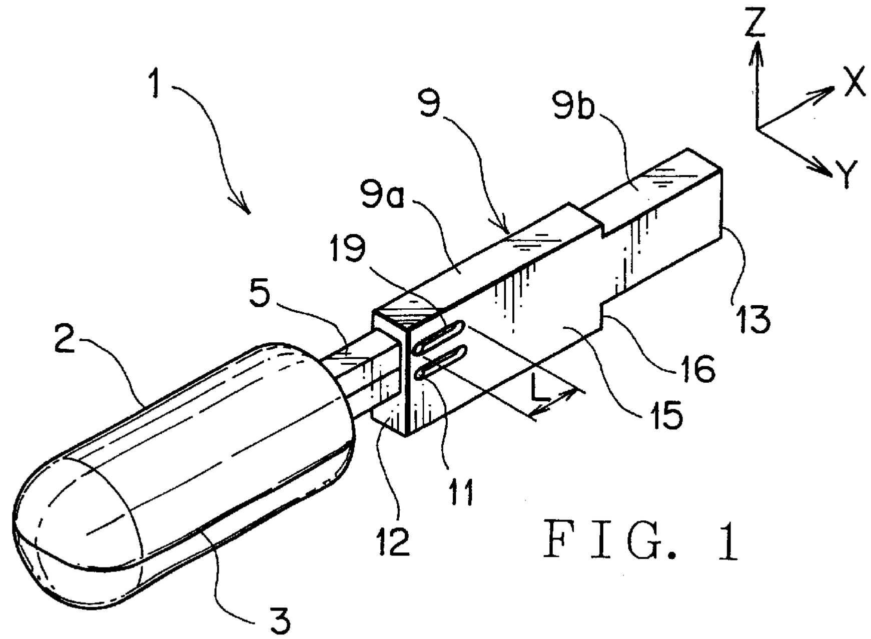
FIG. 1 is a whole perspective view of a terminal extracting tool, showing one embodiment according to this invention.
Figure 2:
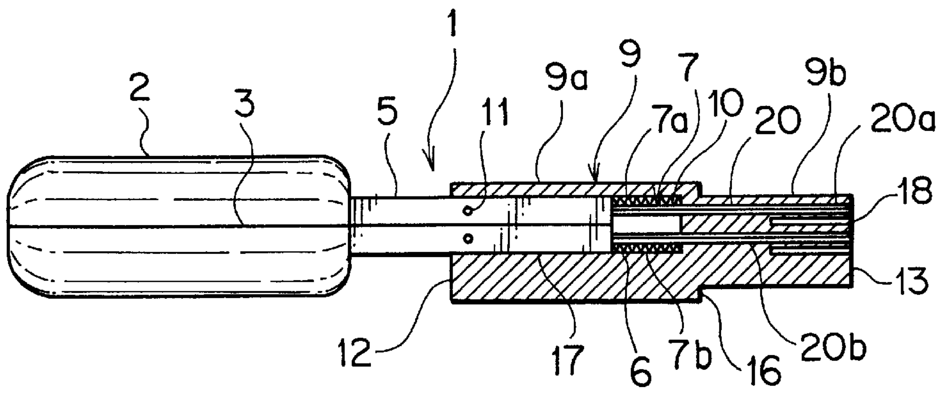
FIG. 2 is a vertical sectional view of the terminal extracting tool shown in FIG. 1.

As shown in FIGS. 1 and 2, this terminal extracting tool comprises a bar-shape grip 2 which is divided in two pieces of upper and lower at a partition line 3, a beam member 5 projecting from a front end of the grip 2 and providing at a front end thereof with a straight line lock release pin 7 corresponding to a flexible locking piece 31 in a terminal receiving section 32 of a connector housing 30 (FIG. 6 or 8), a holder 9 receiving said beam member 5 to slide freely and a coil spring 10 (elastic member) mounted into the holder 9 in compressed condition to energize the beam member 5 rearwardly. The grip 2 and the beam member 5 can be formed into one piece or made as a separated piece. When they are made as a separated piece, an assembled piece with the beam member 5 provided with a male type thread and the grip 2 provided with a female type thread may be used, for example. The holder 9 is provided with a beam member guide hole 17 receiving the beam member 5 to slide freely, a pin guide hole 20 communicating with the beam member guide hole 17 and an escape hole 18 (escape) for a tab shape portion 41 (electrical contact portion) of a male type terminal 40.

Figure 3:
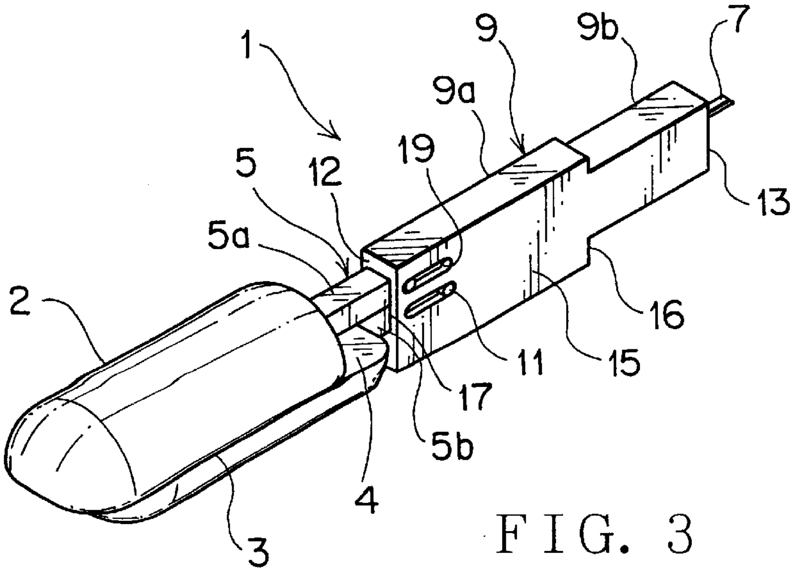
FIG. 3 is a perspective view for describing condition of a beam member divided in an upper and lower members of the terminal extracting tool, shown in FIG. 1.

As shown in FIG. 3, the beam member 5 with rectangular cross section is divided in an upper member and a lower member at the partition line 3 and the upper and lower members 5*a*, 5*b* can slide independently of each other and an attached surface 4 of the both members 5*a*, 5*b* is a sliding surface. The beam member 5 is inserted from the beam member guide hole 17 opened on a rear surface 12 of the holder 9 and received and held therein. The beam member 5 is provided in the middle area of one side surface with a positioning projection 11. The positioning projection 11 is engaged with an oval opening 19 communicating from an inner wall of the beam member guide hole 17 to a holder side surface 15 and then the beam member 5 can move back and forth within a distance corresponded to stroke L of the oval opening 19. This stroke L is the same as a projecting length of the lock release pin 7 and a length to insert a gap by bending the flexible locking piece 31.

Figure 6:
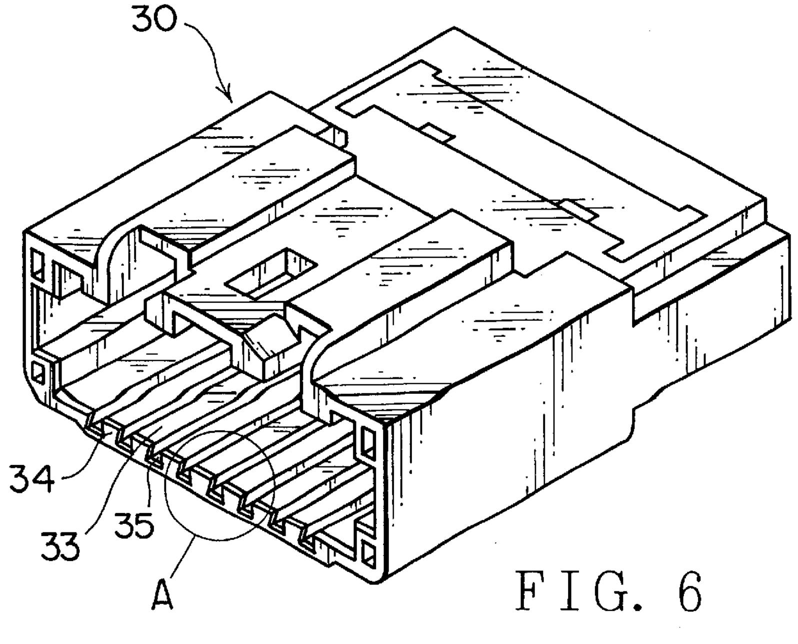
FIG. 6 is a perspective view of one embodiment of a female type connector housing.

Since the male type terminals 40, received into the female type connector housing 30 shown in FIG. 6, are provided vertically as two tiers therein, the beam member is divided in an upper part and a lower part. In case of a connector housing providing vertically at three tiers with the male type terminals 40, the beam member may be divided vertically in three tiers.

Figure 11:
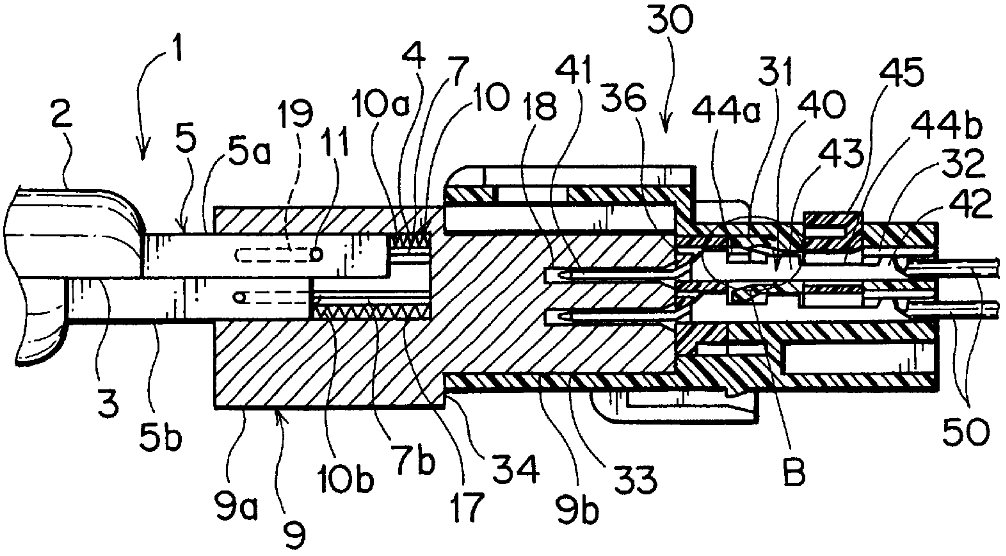
FIG. 11 is a vertical sectional view of inserting the terminal extracting tool into a female type connector.
Figure 12:
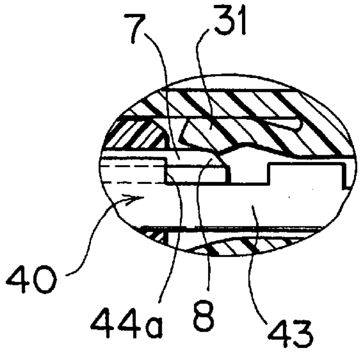
FIG. 12 is a B-area expanded view of FIG. 11.
Figure 13:
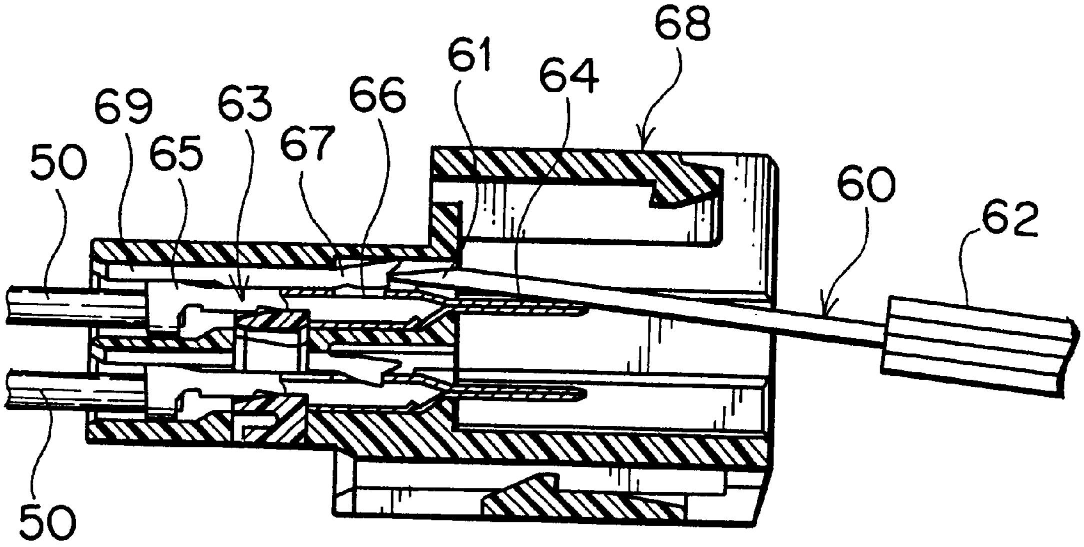
PRIOR ART FIG. 13
FIG. 13 is a sectional view of a terminal extracting tool by prior art.
Figure 14:
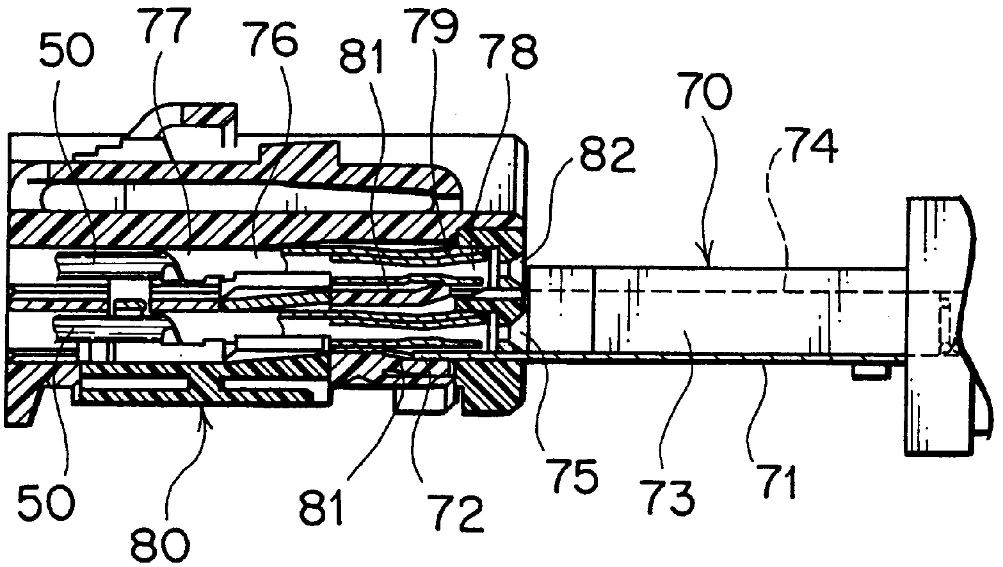
PRIOR ART FIG. 14
FIG. 14 is a sectional view of the other terminal extracting tool by prior art.

Two lock release pins 7*a*, 7*b*, provided on the front end of the beam member 5, are inserted into pin guide holes 20*a*, 20*b*, forking from the beam member guide hole 17 and extending straightly to a axial direction (X direction). Forming the lock release pin 7 with a cross-sectional L-shape is for guiding the lock release pin 7 straightly along one side surface and an upper surface of a box shape portion 43 (FIG. 11) located in a middle area of the male type terminal 40 locked by the flexible locking piece 31 of the connector housing 30. Therefore, damaging inner wall of the terminal receiving section 32 or destroying the male type terminal 40 by bending the lock release pin 7 can be prevented.

The lock release pin 7 is provided on the front end with a sharp edge portion 8 having a upper slant surface. Providing with the sharp edge portion 8 is for inserting the front end of the lock release pin 7 into the front end of the flexible locking piece 31 and bending the front end of the flexible locking piece 31 upwardly by sliding on the slant surface smoothly to release locking easily.

The holder 9 receiving the beam member 5, mentioned above, will be described with reference to FIGS. 3, 4. The holder 9 is provided at the forepart with a small box shape holder fitting portion 9*b* to fit a connector fitting section 33 and with a large box shape holder body portion 9*a* extending from the forepart. A step surface 16 of the holder body portion 16 performs as a stopper when connecting the holder fitting portion 9*a* with the connector fitting section 33. The step surface 16 contacts firstly with a opening end edge 34 of the connector housing 30 so that a front end surface 13 of the holder fitting portion 9*b* would not contact with a rear wall of the connector fitting section 33. Thus, forwardly moving of the lock release pin 7 is limited by position control by the step surface 16.

The holder body portion 9*a* is provided on one side surface 15 with the oval opening 19, opened in a axial direction, engaging with the positioning projection 11. The stroke L of the oval opening 19 is the same as a moving distance of the lock release pin 7. In case of too long stroke L, the lock release pin 7 is deeply pushed forwardly and then the flexible locking piece 31 which is formed like a cantilever on a inner wall of the terminal receiving section 32 of the connector housing 30 may be broken. Conversely, in case of too short stroke L, the lock release pin 7 can not reach the front end of the flexible locking piece 31 and then the flexible locking piece 31 may not be bent upwardly. Therefore, in this invention, the stroke L of the oval opening 19 is optimized based on a depth of the connector fitting section 33.

The beam member guide hole 17 of the holder body portion 9*a* is provided with a coil spring 10 for pushing the beam member 5 rearwardly, as shown in FIG. 2. One end of the coil spring 10 contacts with the front surface of the beam member 5 and the other end thereof contacts with an end face of the beam member guide hole 17 in compression condition. The beam member 5 is always pushed rearwardly by the coil spring 10 and the most rear position is determined by the position where the positioning projection 11 contacts with a rear end of the oval opening 19. At that time, the front end of the lock release pin 7 is behind the front end surface 13 of the holder fitting portion 9*b*.

When the beam member 5 is pushed forwardly, the coil spring 10 is compressed more and the positioning projection 11 is moved forwardly and the most front position is determined by the position where the positioning projection 11 contacts with the front end of the oval opening 19. At this time, the front end of the lock release pin 7 comes out from the front surface 13 of the holder fitting portion 9*b*. In this condition, the front end of the lock release pin 7 bends the flexible locking piece 31 upwardly and the male type terminal 40 can be easily extracted from the connector housing 30 by pulling the electric wire 50 connected with the male type terminal 40.

Figure 4:
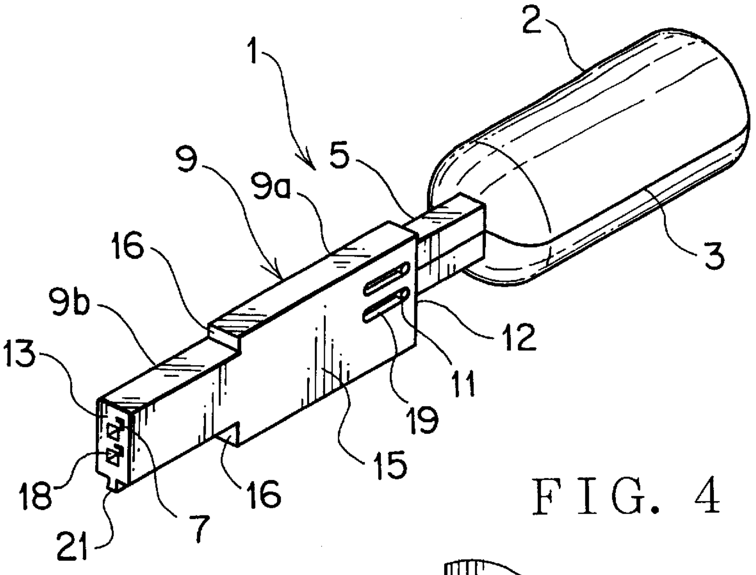
FIG. 4 is a whole perspective view from a front end of the terminal extracting tool shown in FIG. 1.
Figure 5:
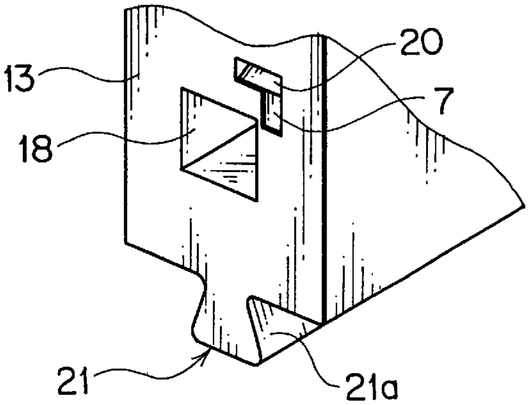
FIG. 5 is a partial expanded perspective view of the whole perspective view shown in FIG. 4, showing a dovetail shape convex spline on a holder bottom surface.
Figure 7:
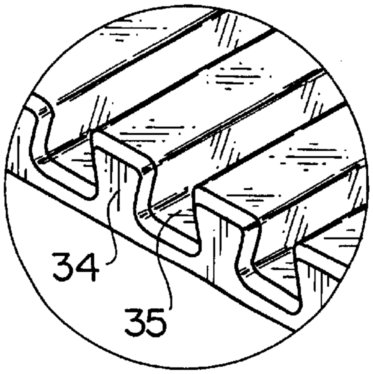
FIG. 7 is a A-area expanded perspective view of the whole perspective view shown in FIG. 6, showing a dovetail groove.
Figure 9:
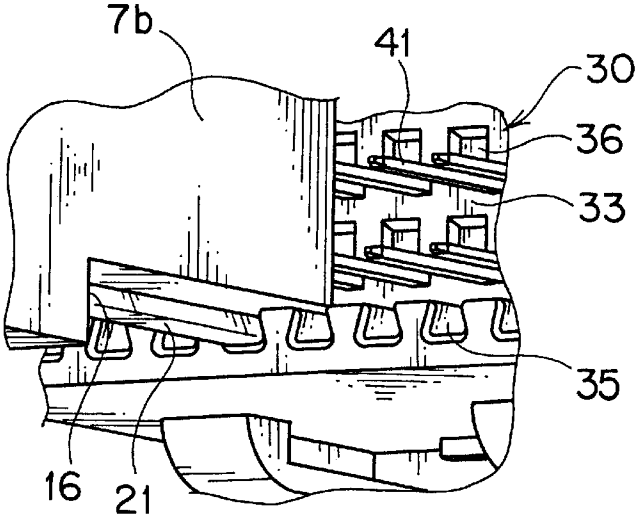
FIG. 9 is a partial expanded perspective view of the whole perspective view shown in FIG. 8, showing condition of inserting the dovetail shape convex spline of the terminal extracting tool into the dovetail groove of the connector housing.

The holder fitting portion 9*b* is provided on the center in a width direction (Y direction) on the bottom surface with a dovetail convex spline 21, as shown in FIGS. 4, 5. The convex spline 21 has a tapered surface 21*a* on the both sides and positions the lock release pin 7 in a width direction by engaging with a dovetail groove 35 provided on a bottom surface of the connector fitting section 33 shown in FIGS. 6, 7. If the holder 9 is free without position control on connecting the holder fitting portion 9*b*, the lock release pin 7 may not be placed corresponding to a pin insertion hole 36 (FIG. 9).

The holder fitting portion 9*b* is provided on the front surface 13 with an escape hole 18 for a tab shape portion 41 of the male type terminal 40. The escape hole 18 is formed into a blind hole, closed at rear side. The clearance hole is formed to have a square cross section for corresponding to a cross sectional shape of the tab shape portion 41 of the male type terminal 40. It is not always required to have a square cross section and it is effective to have a rectangular cross section or a circular cross section. The dimension of the cross sectional shape of the escape hole 18 may be formed slightly larger than the tab shape portion 41 and the depth of the hole may be enough to escape completely whole body from the front end to a foot of the tab shape portion 41.

The escape hole 18 for tab shape portion 41 and the pin guide hole 20 of the lock release pin 7 will be described next. The escape hole 18 and the pin guide hole 20 are in parallel to each other and both of them is provided in an axial direction, as shown in FIGS. 4, 5. The escape hole 18 is a blind hole and is located on the center of the width of the front surface 13 of the holder fitting portion 9*b*. The terminal 15 is provided at one end thereof with a rectangular box shape electrical contact portion 16 and at the plate 29 by bending inwardly the top edges of both side walls 28*a*, 28*b*.

The escape hole 18 is located on the center of the width and the pin guide hole 20 is located near outer side from the center in a width direction. It is caused by position deference between an axis of the tab shape portion 41 of the male type terminal 40 and a first locked portion 44*a* of the male type terminal 40. The first locked portion 44*a* of the male type terminal 40 is located near outer side in width and also the front end of the flexible locking piece 31 abutting on the sharp end edge 8 of the lock release pin 7 is located near outer in width. If the first locked portion 44*a* of the male type terminal 40 is located on the center of the width thereof, a contact portion of the flexible locking piece 31 is located on the center of the width thereof and then the pin guide hole 20 is required to be located on the center in width.

Figure 8:
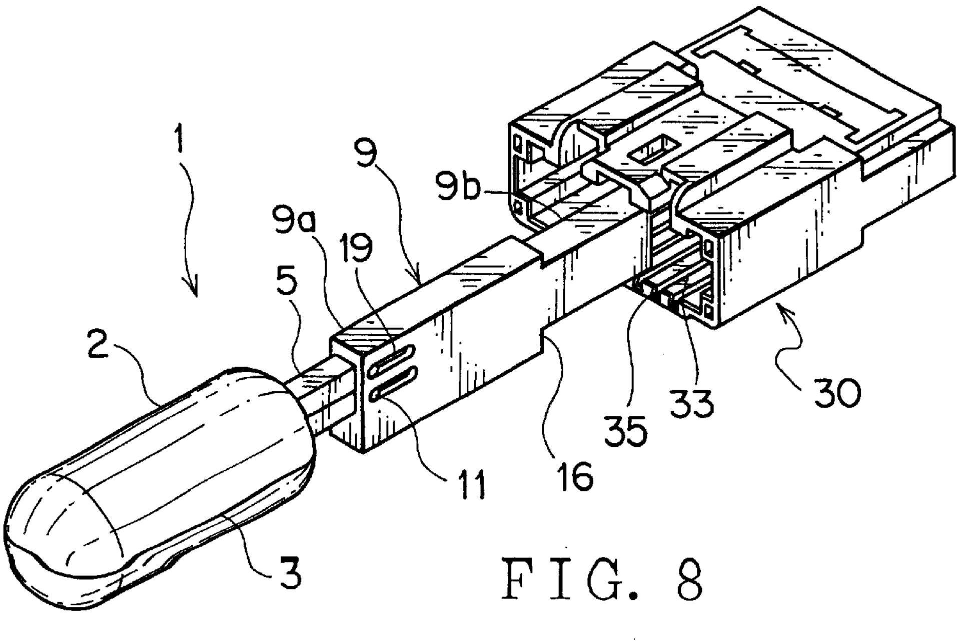
FIG. 8 is a perspective view of condition of inserting the terminal extracting tool into the female type connector housing shown in FIG. 6, describing operation method of the terminal extracting tool shown in FIG. 1.

Operation method for a terminal extracting tool will be described with reference to FIGS. 8–12 as following. Firstly, positioning method of the extraction tool will be described. As shown in FIGS. 8, 9, the convex spline 21 provided on a bottom surface of the holder fitting portion 9*b* is inserted into the dovetail groove 35 of the connector housing 30. Thereby, the holder fitting portion 9*b* is positioned in width with no wobbling. Though the convex spline 21 is formed into dovetail shape, other shape for positioning in width accurately, for example a convex spline with rectangular cross section, can be used. Pushing the holder 9 forwardly, it moves forwardly as the convex spline 21 following the groove 35.

Figure 10:
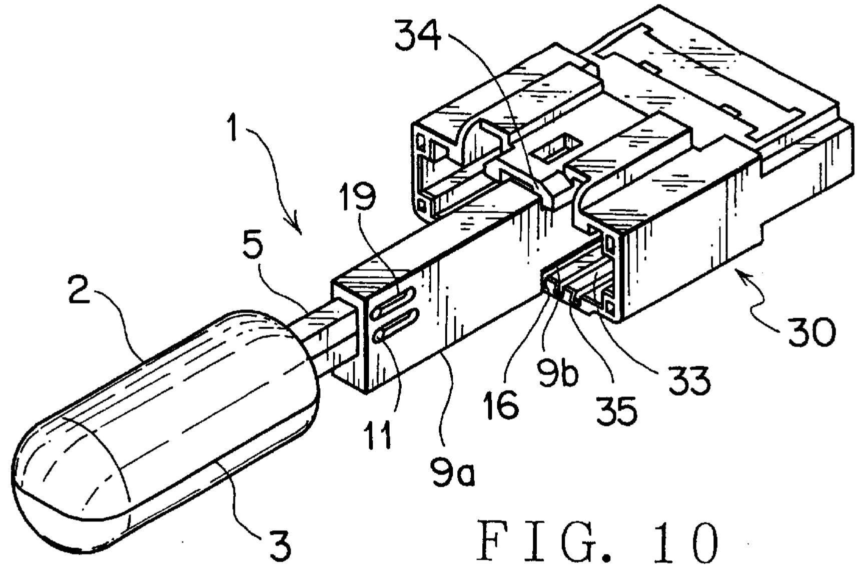
FIG. 10 is a perspective view for describing condition of the terminal extracting tool pushed forwardly and positioned by a stepped end surface of a holder body portion.

When pushing the holder 9 more forwardly as shown in FIG. 10, the stepped end surface 16 of the holder body portion 9*a* abuts on the opening end edge 34 of the connector housing before the front end surface 13 of the holder fitting portion 9*b* abuts on the rear wall of the connector fitting section 33. Then, The holder 9 is positioned accurately in axial direction. Thereby, the extracting tool is positioned in width and axial directions and the lock release pin 7 is aligned correspondingly to the pin insertion hole 36. Positioning on height direction (Z direction) is based on a bottom wall surface of the connector fitting section.

Method of extracting the male terminal 40 will be described next. The bar shape male type terminal 40 is provided at one end thereof with the electric wire joint portion 42 and at the other end with the tab shape portion 41 to be connected electrically with a mating female terminal and between the electric wire joint portion 42 and the tab shape portion 41 with a box shape portion 43. The male type terminal 40 is received in the terminal receiving section 32 of the connector housing in condition of the tab shape portion 41 penetrating into the bottom wall surface of the connector fitting section 33. The box shape portion 43 is provided in a front half portion, nearby the tab shape portion 41, with the first locked portion 44*a* and in a rear half portion with a second locked portion 44*b*. The first locked portion 44*a* is locked by the flexible locking piece 31 provided projectionaly on the inner wall of the terminal receiving section 32. The second locked portion 44*b* is locked by inserted a spacer 45.

The spacer 45 shall be removed to release the second lock before operating the terminal extracting tool. Thereby, the male type terminal 40 is locked only by the flexible locking piece 31. Then, moving the upper beam member 5*a* forwardly against spring force of the coil spring 10, the lock release pin 7*a* provided at the front end of the beam member 5*a* comes out from the front end surface 13 of the holder fitting portion 9*b*. Pushing the holder more forwardly, the flexible locking piece 31 is bent upwardly to follow upper slant surface of the sharp end edge 8 on the front end of the lock release pin 7 and then, the terminal lock is released.

Forward moving distance of the lock release pin 7*a* is determined by the stroke L for allowing the positioning projection 11, provided on one side wall of the beam member 5*a*, to move back and forth in the oval opening 19. Therefore, when the positioning projection 11 abuts on the front end of the oval opening 19 and terminal lock is released, the lock release pin 7*a* can not move more forwardly and then damage of the male type terminal 40 by over moving forwardly is prevented.

In this condition, the male type terminal 40 is extracted easily by pulling the electric wire 50. After that, abating forward pushing force on the grip 2, the beam member 5*a* returns to the position in which the positioning projection 11 abuts on the rear end of the oval opening 19 by expansile spring force of the coil spring 10. Therefore, extracting the lock release pin 7 from the pin insertion hole 36 is automatically done by the spring force without extracting operation.

Regarding lower beam member 5*b*, the lower male type terminal 40 can be extracted by means of releasing the terminal lock to repeat above operation for extracting a terminal. The operation for the lower beam member 5*b* can be done after the upper beam member 5*a* returns original position. Therefore, breaking the upper lock release pin 7*a* in projecting condition is prevented and also deformation of the flexible locking piece 31 is prevented. On the tool structure, it is concerned that one beam member operation may move the other beam member together since the beam member 5 is divided in upper and lower members and a attached surface 4 of said two members 5*a*, 5*b* is a slide surface. However, respective spring force of each spring 10*a*, 10*b* energizing two beam member 5*a*, 5*b* rearwardly is larger than friction force of the attached surface 4 of two beam members 5*a*, 5*b*. Then, moving beam members together is prevented.

Thus, the terminal extracting tool 1 having upper and lower beam members 5 can extract upper and lower male type terminal 40 by one time positioning the holder 9 for fitting to the connector fitting section 33.

What is claimed is:

1. A terminal extracting tool, for extracting a terminal locked by a flexible locking piece in a terminal receiving section of a connector housing, said terminal extracting tool comprising;

a holder provided with an escape for an electrical contact portion of the terminal;

a beam member including at front end thereof a lock release pin arranged to make contact with and unlock said flexible locking piece when extracting;

a beam member guide hole for receiving the beam member slidably therein;

a lock release pin guide hole communicating with the beam member guide hole;

an elastic member, mounted in said beam member guide hole, for pushing the beam member rearwardly and means operatively associated with said holder to remove said terminal from said connector housing.

2. The terminal extracting tool according to claim 1, wherein a front end of the lock release pin in said beam member pushed by the elastic member is placed behind a front end surface of said holder.

3. The terminal extracting tool according to claim 1 or 2, wherein said beam member comprises juxtapositionally at least two members which can slide in an axial direction independently of each other.

4. The terminal extracting tool according to claim 3, wherein each of said two members is pushed rearwardly by respective elastic member.

5. The terminal extracting tool according to claim 3, wherein each beam member is provided at a rear position thereof with a grip which is separated for each of said members.

6. The terminal extracting tool according to claim 1 or 2, wherein the beam member is provided on one side wall thereof with a positioning projection as a stopper means, and the holder is provided on a side wall thereof with an oval opening to slidingly engage with the positioning projection.

7. The terminal extracting tool according to claim 1 or 2, wherein said holder is provided with a stepped end surface for positioning itself when inserting into a connector, said stepped end surface to abut on an open end surface of the connector housing.

8. The terminal extracting tool according to claim 1 or 2, wherein said holder is provided on a bottom surface thereof with a convex spline for slidingly engaging with a groove of a connector fitting section when inserted into the connector.

* * * * *